United States Patent
Istomin et al.

(10) Patent No.: US 10,652,272 B2
(45) Date of Patent: *May 12, 2020

(54) SECURITY NETWORK BUFFER DEVICE

(71) Applicant: AT&T Intellectual Property I, L.P., Atlanta, GA (US)

(72) Inventors: Mikhail Istomin, Brooklyn, NY (US); Wei Wang, Weehawken, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 247 days.

This patent is subject to a terminal disclaimer.

(21) Appl. No.: 15/602,241

(22) Filed: May 23, 2017

(65) Prior Publication Data

US 2017/0264636 A1  Sep. 14, 2017

Related U.S. Application Data

(63) Continuation of application No. 14/231,588, filed on Mar. 31, 2014, now Pat. No. 9,692,780.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC ...... *H04L 63/1441* (2013.01); *H04L 63/1416* (2013.01)

(58) Field of Classification Search
CPC . H04L 63/14; H04L 63/1408; H04L 63/0209; H04L 63/0218; H04L 63/0272; H04L 63/1441; H04L 63/1416
See application file for complete search history.

(56) References Cited

U.S. PATENT DOCUMENTS

| | | |
|---|---|---|
| 7,035,270 B2 | 4/2006 | Moore et al. |
| 7,149,474 B1 | 12/2006 | Mikhak |
| 7,313,819 B2 | 12/2007 | Burnett et al. |
| 7,551,628 B2 | 6/2009 | Holder |

(Continued)

FOREIGN PATENT DOCUMENTS

| | | |
|---|---|---|
| WO | 2004107086 A1 | 12/2004 |
| WO | 2009115154 A1 | 9/2009 |

(Continued)

OTHER PUBLICATIONS

Prevelakis, Vassilis, and Angelos Keromytis. "The Shrink-Wrapped VPN Node," The Department of Computer & Information Science Technical Reports, University of Pennsylvania, 2000, 12 Pages.

(Continued)

*Primary Examiner* — Trong H Nguyen
*Assistant Examiner* — Amie C. Lin
(74) *Attorney, Agent, or Firm* — Amin, Turocy & Watson, LLP

(57) ABSTRACT

A secure connection is facilitated between a device and a network. A security buffer device is used to determine an available network and connect to the network. The security buffer device can then allow the device to connect to the network via the security buffer device. The security buffer device can monitor any security breaches from the network and perform an action based on the indication of a security breach.

20 Claims, 10 Drawing Sheets

Security Buffer Device

(56) References Cited

U.S. PATENT DOCUMENTS

| | | | |
|---|---|---|---|
| 8,069,465 | B1 | 11/2011 | Bartholomay et al. |
| 8,069,584 | B2 | 11/2011 | Bartholomay et al. |
| 8,181,262 | B2 | 5/2012 | Cooper et al. |
| 8,423,779 | B2 | 4/2013 | Hamlin et al. |
| 8,544,062 | B2 | 9/2013 | Sever et al. |
| 8,600,295 | B2 | 12/2013 | Rappaport |
| 8,793,774 | B1 | 7/2014 | Kumar et al. |
| 2002/0023210 | A1 | 2/2002 | Tuomenoksa et al. |
| 2003/0233332 | A1 | 12/2003 | Keeler et al. |
| 2004/0123139 | A1* | 6/2004 | Aiello ............... H04L 63/0227 713/154 |
| 2004/0260943 | A1* | 12/2004 | Piepiorra ........... H04L 63/0209 726/11 |
| 2005/0141447 | A1 | 6/2005 | Carlton et al. |
| 2006/0064754 | A1* | 3/2006 | Frank ............... H04L 63/105 726/23 |
| 2006/0112275 | A1 | 5/2006 | Jeal et al. |
| 2007/0130457 | A1 | 6/2007 | Kamat et al. |
| 2007/0199061 | A1* | 8/2007 | Byres ............... H04L 41/0806 726/11 |
| 2008/0117884 | A1* | 5/2008 | Ishii ............... H04W 12/06 370/338 |
| 2008/0232588 | A1 | 9/2008 | Christison |
| 2008/0250485 | A1 | 10/2008 | Schreyer et al. |
| 2009/0138575 | A1 | 5/2009 | Lin et al. |
| 2009/0327736 | A1* | 12/2009 | Cam-Winget ....... H04L 63/061 713/181 |
| 2011/0035468 | A1 | 2/2011 | Khare et al. |
| 2011/0164598 | A1 | 7/2011 | Lee et al. |
| 2011/0270952 | A1 | 11/2011 | Ray et al. |
| 2012/0174177 | A1 | 7/2012 | Bartholomay et al. |
| 2013/0191906 | A1 | 7/2013 | Park et al. |
| 2013/0247132 | A1* | 9/2013 | Dey ............... G06F 21/00 726/1 |
| 2013/0305369 | A1* | 11/2013 | Karta ............... H04L 63/1416 726/23 |
| 2014/0335823 | A1* | 11/2014 | Heredia ............... H04L 51/38 455/411 |
| 2014/0351880 | A1 | 11/2014 | Low | |

FOREIGN PATENT DOCUMENTS

| | | |
|---|---|---|
| WO | 2012024444 A1 | 2/2012 |
| WO | 2013082333 A1 | 6/2013 |

OTHER PUBLICATIONS

"Mobile WIFI Router-Best Features of Mobile WIFI Router," MobileWiFiRouter.net http://mobilewifirouter.net/, 2 Pages.

"BRCK—Your Backup Generator for the Internet," kickstarter.com, https://www.kickstarter.com/projects/1776324009/brck-your-backup-generator-for-the-internet, 18 Pages.

"mGuard smart/\2—Portable Security At Its Best" innominate.com http://www.innominate.com/en/products/mguard-smart2, 2 Pages.

Prevelakis, Vassilis, and Angelos Keromytis. "Drop-in Security for Distributed and Portable Computing Elements," Internet Research 13.2 (2003): 107-115, 10 Pages.

Bailey, Dave, "Zyxel ZyWall P1," computing.co.uk, Jul. 7, 2005 http://www.computing.co.uk/ctg/review/1814448/zyxel-zywall-p1, 1 Page.

Office Action for U.S. Appl. No. 14/231,588 dated Jun. 7, 2016, 33 pages.

Office Action for U.S. Appl. No. 14/231,588 dated Oct. 5, 2016, 31 pages.

Office Action for U.S. Appl. No. 14/231,588 dated Dec. 2, 2015, 29 pages.

* cited by examiner

SECURITY NETWORK BUFFER DEVICE

RELATED APPLICATION

The patent application is a continuation of, and claims priority to, U.S. patent application Ser. No. 14/231,588, filed Mar. 31, 2014, and entitled "SECURITY NETWORK BUFFER DEVICE". The entirety of the foregoing application is hereby incorporated by reference herein.

TECHNICAL FIELD

This disclosure relates generally to facilitation of secure private network usage within unknown environments.

BACKGROUND

Home or work wireless network environments that are privately managed by an end-user are generally secure for that end-user's goals. However, it is not uncommon for an end-user to want access to a public network when they are outside of their privately managed network. When an end-user gains access to a public network outside of their privately managed network, security guarantees may not be as reliable.

Some examples of potentially unsecure public networks include: open Wi-Fi networks in airports and cafes, wired connectivity in hotels, and prepaid cell data access provided in foreign countries. A large number of possible threats exist ranging from encrypted Wi-Fi access points that anyone can sniff data from, to malicious entities posing as fake services or unscrupulous staff at legitimate service providers. The aforementioned can lead to exposure of an end-user's private or sensitive information.

Connecting an end-user device directly to these compromised networks, can allow the end-user's personal information to be scanned or compromised from the end user's device.

The above-described background relating to unsecure networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
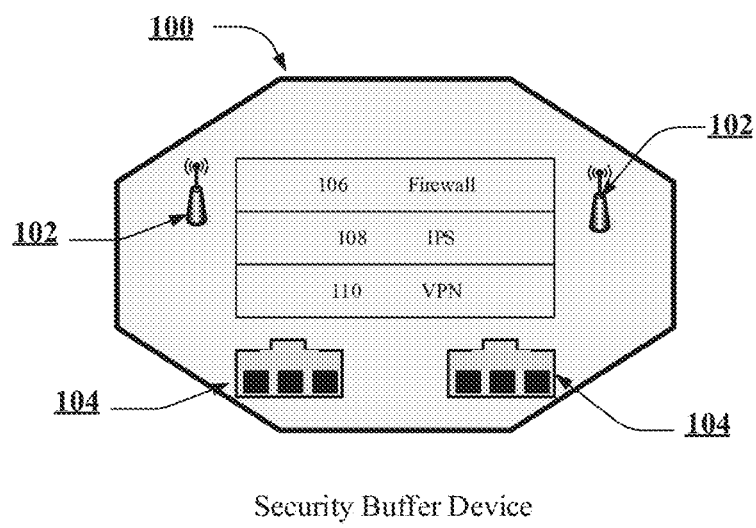
FIG. 1 illustrates an apparatus capable of securely connecting a device to an available network.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above identified deficiencies and other drawbacks of public wireless networks, various embodiments are described herein to facilitate the use of public wireless networks in a secure means.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Notwithstanding possible network security issues mentioned in the background, utilizing a configurable security buffer when connecting to publicly accessible wireless networks can prevent security breaches for end-user devices.

Described herein are systems, methods, articles of manufacture, and other embodiments or implementations that can facilitate usage of a private network. Facilitating secure private network usage can be implemented in connection with any type of device with a connection to a communications network (a wireless communications network, the Internet, or the like), such as a mobile handset, a computer, a handheld device, or the like.

A security buffer device can allow private communication between an end-user device and a public network while eliminating or mitigating security risks associated with a non-secure network device of the public network. Another option for the security buffer device is that it can be implemented of a size that allows for ease of portability during transportation. The security buffer device can provide the capabilities of a Virtual Private Network (VPN) client, Network Address Translation (NAT), firewall, or Internet Provider Security (IPS) for a limited number of end-users. Wired or wireless capabilities are also possible via Ethernet, Bluetooth, or the like. The wired or wireless capabilities can be between the end-user device and the security buffer device, or the security buffer device and the chosen network. Available networks can be discovered and accessed by the security buffer device in order to facilitate communication between the end-user device and the available network. Due to a small and well-defined number of functions, the security buffer device can prevent external attacks by unsecured public networks via enforcement of policies held directly on the security buffer device in a security management platform, abstracting the risk away from the end-user device.

In one embodiment, one side of the security buffer device communicates with the end-user device and acts as a gateway to an external network, and the other side of the security buffer device communicates with the external network. The security buffer device can also communicate with a server, which hosts a security management platform. The security management platform can regulate network traffic between the security buffer device and the wireless network, and dictate how communication takes place between end-user devices and wireless networks. Once a security breach is determined, the security buffer device can take the action of initiating a lockdown mode that can prohibit communication between the network, the security buffer device, and/or the end-user device. Furthermore, once a network has been determined to have a security breach, said network's credentials can be stored on the security buffer device or forwarded and stored at a security management platform to increase current and future security measures.

According to one embodiment, described herein is a method for securely connecting to a communication network. The method can determine network availability, monitor the security status of the network, and perform an action based on a security breach.

According to another embodiment, an article of manufacture, such as a computer readable storage medium or the like, can store instructions that, when executed by a computing device, can facilitate receiving a signal from an available network and connecting an end-user device to the network. The article of manufacture can also monitor the connection for a security breach and perform an action based on a security breach.

According to yet another embodiment, described herein is an apparatus for facilitating receiving a signal from an available network and connecting an end-user device to the network. The apparatus can also monitor the connection for a security breach and perform an action based on a security breach.

Additionally, according to a further embodiment, described herein is a system that can facilitate a connection between a first device and a network device and establish a secure channel between the first device and the network device. The system can also facilitate a secure connection between a second device and a first device and enable communication between the second device and the network device. The system can include a display component capable alerting a user of a breach in security and/or a change in device status. The system can also include one or more servers in a cloud-computing environment that can store information about available networks and system preferences set by the user.

These and other embodiments or implementations are described in more detail below with reference to the drawings.

Referring now to FIG. 1, illustrated is an apparatus capable of securely connecting a device, such as an end-user device, to an available network. The security buffer device 100 can comprise several different components to facilitate secure wireless communication between the end-user device and a public network. The security buffer device 100 can comprise an independent power supply or have the capabilities to draw power from an external device. The security buffer device 100 can communicate with end-user devices and networks via wired or wireless means. To communicate via a wired means, the security buffer device 100 can comprise Ethernet ports 104 where one Ethernet port 104 can be used to connect to the end-user device and another Ethernet port 104 can be used to connect to a network device via an Ethernet cord. Security buffer device 100 can also connect to a network via a wireless means, including but not limited to: Wi-Fi, Bluetooth, 3G, 4G, or the like. To facilitate wireless communication, the security buffer device 100 can comprise one or more transceivers 102. The transceivers 102 can scan for available networks and facilitate communication between the security buffer device 100 and the available networks.

Once the security buffer device 100 has determined network availability, the security buffer device 100 can defer to the end-user device to allow the end-user device to receive a selection of a preferred available network. The security buffer device 100 can have a list of user-defined networks stored in a memory. Network selection can also be based on agreement data representing service provider agreements, access to the publicly available wide area networks (WANs) via Wi-Fi, or wired/non-wired preferences. The security buffer device 100 can also comprise a global positioning system (GPS) or the like, which will allow the security buffer device 100 to determine when it is in an area in which it has identified previous security breached network(s) on prior occasion(s).

The security buffer device 100 can comprise a security stack including, but not limited to, a firewall 106, an IPS 108, a VPN 110, and/or any other security means with similar functionalities can sit between the network and the end-user device. Furthermore, the security buffer device 100 can comprise an audio or visual alert means to provide an indication that a network's security has been breached. An audio alert can be communicated via a speaker or the like and the visual alert can comprise a light emitting diode (LED), a display shown on a display screen, or the like.

Figure 2:
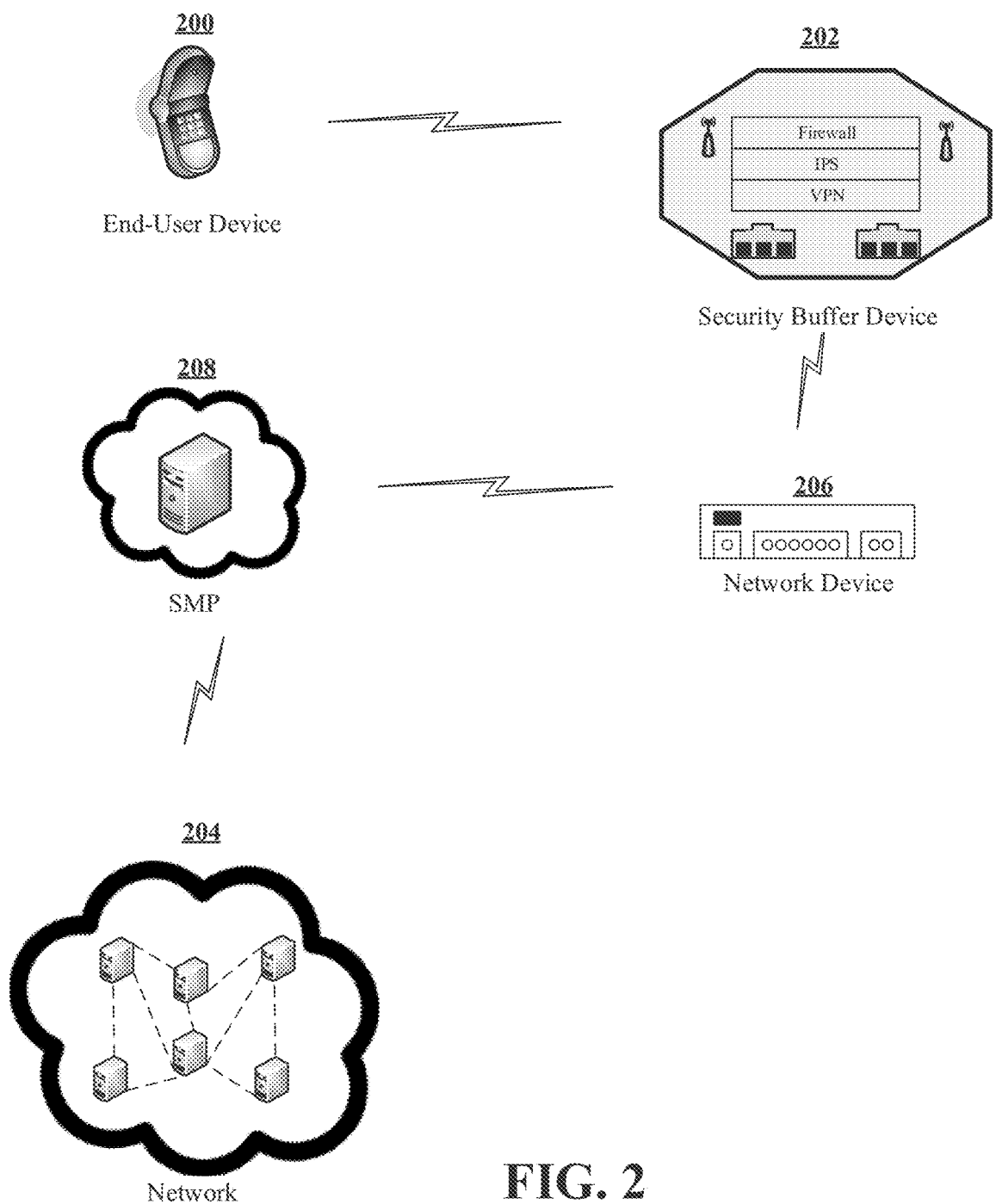
FIG. 2 illustrates a system for securely connecting a device to a network via a security management platform and a network device.

Referring now to FIG. 2, illustrated is a system for securely connecting an end-user device 200 to a network 204 via a security management platform 208 and a network device 206. The security buffer device 202 can comprise several different components to facilitate secure wireless communication between an end-user device and a network. The end-user device 200 can connect to the security buffer device 202 via a wired or wireless means. To communicate via a wired means, the security buffer device 202 can comprise Ethernet ports used to connect to a network device via an Ethernet cord. Security buffer device 202 can also connect to a network 204 via a wireless means, including but not limited to: Wi-Fi, Bluetooth, 3G, 4G, or the like. The security buffer device can comprise an independent power supply or have the capabilities to draw power from an external device. To facilitate wireless communication, the security buffer device 202 can comprise one or more transceivers, which can scan for and communicate with available networks.

Once the security buffer device 202 has determined an available network by communicating with a network device 206, including but not limited to a wireless router, the security buffer device 202 can defer to the end-user device 200 to allow the end-user device to receive a selection of a preferred available network 204 or the security buffer device can select the best available network 204. The network 204 can include a cloud-computing environment that can enable convenient, on-demand network 204 access to a shared pool of configurable computing resources. Such resources can include information on servers, which can be accessed by various end-user devices 200, such as a computer or any mobile device. The end-user devices 200 can access information, which can be stored on a server or a network 204 of servers.

The security buffer device 202 can have a list of user-predefined networks 204 stored in a memory; or network 204 selection can also be based on agreement data representing service provider agreements, access to publicly available WANs via Wi-Fi, or wired/non-wired preferences. The security buffer device 202 can also comprise a global positioning system (GPS) or the like, which allows the security buffer device 202 to know when it is in an area in which it has identified previous security breached network(s) 204 on prior occasion(s). Based on a determination of a geographic area comprising a previously breached network 204, the security buffer device 202 can perform an action. The action can include, but is not limited to, presenting a cautionary warning to an end-user device 200, forwarding such security breach information to the security management platform 208, and/or lowering the priority of an available network 204 due to a previous security breach. The security buffer device 202 can also change the status of a once available network 204 to a status of a security breached network 204 and send a message to the end-user device 200 and/or the security management platform 208.

The security buffer device 202 can comprise a security stack including but not limited to a firewall, an IPS, a VPN, and/or any other security means with similar functionalities can sit between the network 204 and the end-user device 200. Furthermore, the security buffer device 202 can comprise an audio or visual alert means to indicate that a network's 204 security has been breached. An audio alert can be communicated via a speaker or the like; and the visual alert can comprise a light emitting diode (LED), a display shown on a display screen, or the like.

The security buffer device 202 can also communicate with a server via the network device 206, which hosts a security management platform 208; the security management platform 208 can regulate network 204 traffic between the security buffer device 202 and the network 204 and dictate how communication takes place between end-user device 200 and the networks 204. The security management platform 208 can perform a variety of functions including but not limited to: 1) pushing security-based policies to the security buffer device 202; or 2) configuring the security buffer device 202 based on a pre-defined user setting. Security based-policies can include but are not limited to: 1) preventing multiple end-user devices 200 connected to the security buffer device 202 from communicating with each other; 2) blocking communication between the network 204 and the network security buffer device 202 during a lockdown; 3) only allowing hypertext transfer protocol (HTTP) traffic to reach the security buffer device 202; 4) closing wired or wireless security buffer device 202 ports if there is a security breach; 5) causing the security buffer device 202 to disengage any connected end-user devices 200; 6) causing the security buffer device 202 to select another available network 204; 7) causing the security buffer device 202 to display an indication that a security breach has occurred; and/or 8) sending a notification that a lockdown has occurred. The security management platform 208 can also allow a user to predetermine a master device whereby the master device can be the only device, which can unlock the security buffer device 202.

Figure 3:
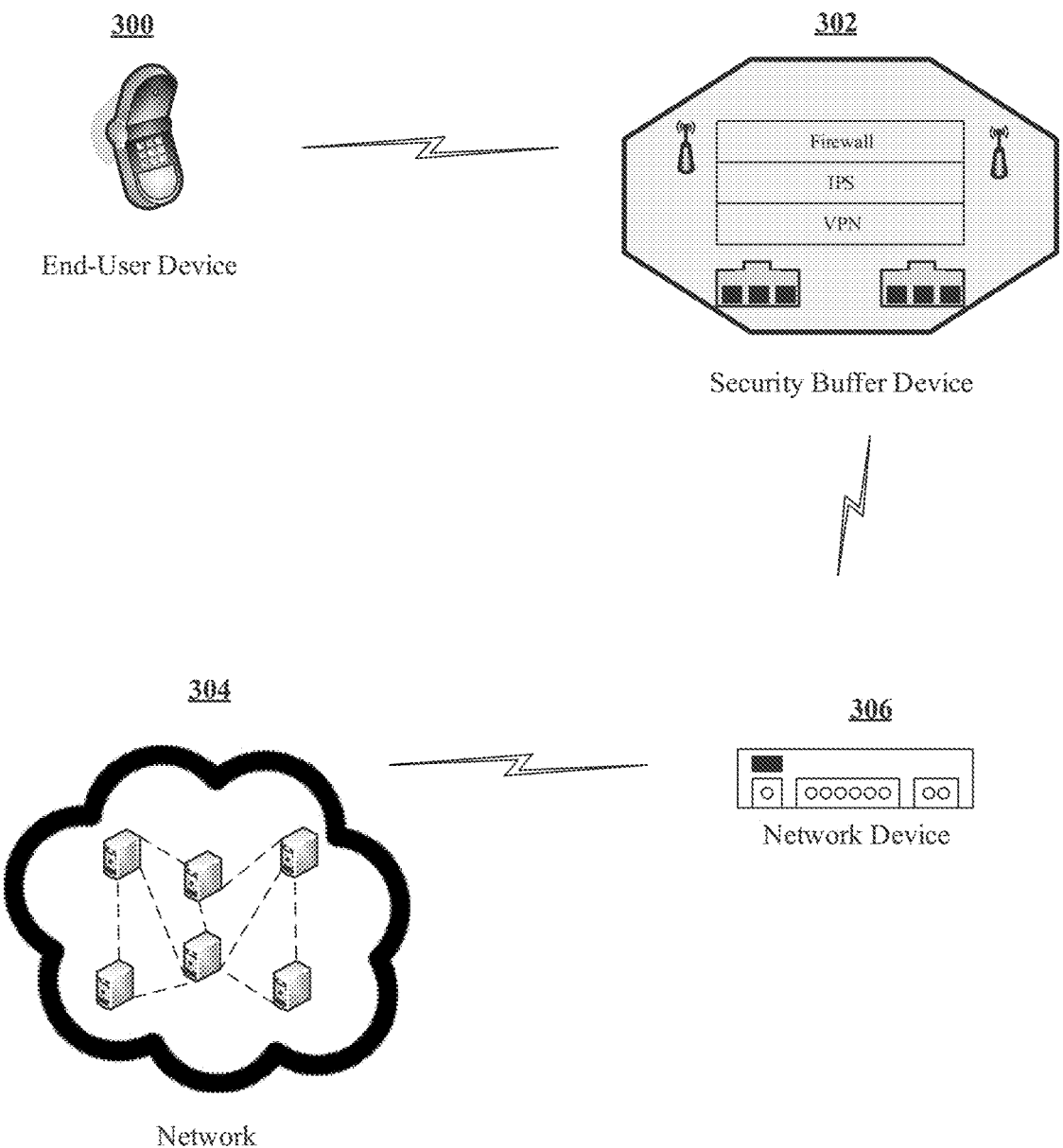
FIG. 3 illustrates a system for securely connecting a device to a network via a network device.

Referring now to FIG. 3, illustrated is a system for securely connecting an end-user device to a network via a network device. The security buffer device 302 can comprise several different components to facilitate secure wireless communication between an end-user device and a network. The end-user device 300 can connect to the security buffer device 302 via a wired or wireless means. To communicate via a wired means, the security buffer device 302 can comprise Ethernet ports used to connect to a network device via an Ethernet cord. The security buffer device 302 can also connect to a network via a wireless means including, but not limited to: Wi-Fi, Bluetooth, 3G, 4G, or the like. The security buffer device can comprise an independent power supply or have the capabilities to draw power from an external device. To facilitate wireless communication, the security buffer device 302 can comprise one or more transceivers, which can scan for and communicate with available networks.

Once the security buffer device 302 has determined an available network by communicating with a network device 306 including, but not limited to, a wireless router, the security buffer device 302 can defer to the end-user device 300 to allow the end-user device to receive a selection of a preferred available network 304 or the security buffer device can select the best available network 304. The network 304 can include a cloud-computing environment that can enable convenient, on-demand network 304 access to a shared pool of configurable computing resources. Such resources can include information on servers, which can be accessed by various end-user devices 300, such as a computer or any mobile device. The end-user devices 300 can access information, which can be stored on a server or a network 304 of servers.

The security buffer device 302 can comprise a list of user-predefined networks 304 stored in a memory; or network 304 selections can also be based on data representing service provider agreements, access to publicly available WANs via Wi-Fi, or wired/non-wired preferences. The security buffer device 302 can also comprise a global positioning system (GPS) or the like, which allows the security buffer device 302 to know when it is in an area where it has previously identified security breached networks 304. Based on a determination of a geographic area comprising a previously breached network 304, the security buffer device 302 can perform an action. The action can include but is not limited to presenting a cautionary warning to an end-user device 300, presenting a cautionary warning at the security buffer device 302, and/or lowering the priority of an available network 304 due to a previous security breach. The security buffer device 302 can also change the status of a once available network 304 to a status of a security breached network 304 and send a message to the end-user device 300 and/or the security management platform 308.

The security buffer device 302 can comprise a security stack including, but not limited to, a firewall, an IPS, a VPN, and/or any other security means with similar functionalities can be situated between the network 304 and the end-user device 300. Furthermore, the security buffer device 302 can comprise an audio or visual alert means to indicate that a networks 304 security has been breached. An audio alert can be communicated via a speaker or the like; and the visual alert can comprise a light emitting diode (LED), a display shown on a display screen, or the like.

Figure 4:
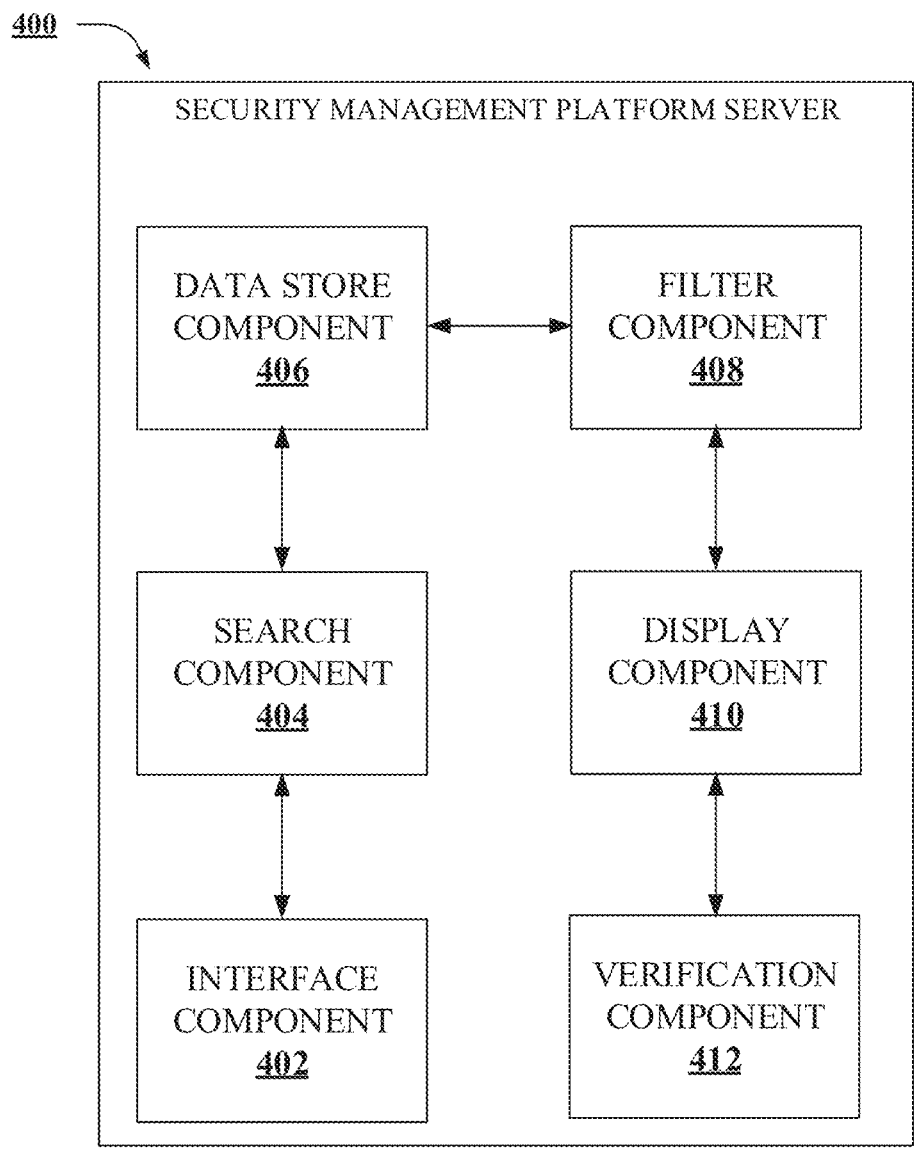
FIG. 4 illustrates a schematic system block diagram of a server in a cloud computing system that can include information stored in a cloud-computing environment.

Referring now to FIG. 4, illustrated is a schematic system block diagram of a security management platform server 400 in a cloud computing system that can include information stored in a cloud-computing environment. The information can include various components that can facilitate secure network usage and the detection of an unsecured network.

The security buffer device can also communicate, via a network device, with a security management platform server 400, which hosts a security management platform. The security management platform server 400 can regulate network traffic between the security buffer device and the network and dictate how communication takes place between an end-user device and a network. The security management platform server 400 can perform a variety of functions including, but not limited to: 1) pushing security-based policies to the security buffer device; or 2) configuring the security buffer device based on a defined user setting. Security based-policies can include, but are not limited to: 1) preventing multiple end-user devices connected to the security buffer device from communicating with each other; 2) blocking communication between the network and the network security buffer device during a lockdown; 3) only allowing HTTP traffic to the security buffer device; 4) closing wired or wireless security buffer device ports if there is a security breach; 5) causing the security buffer device to disengage any connected end-user devices; 6) causing the security buffer device to select another available network; 7) causing the security buffer device to display an indication that a security breach has occurred; and/or 8) sending a notification that a lockdown has occurred. The security management platform server 400 can also allow a user to predetermine a master device whereby the master device can be the only device that can unlock the security buffer device.

The security management platform server 400 can include an interface component 400 that can receive a query from a third-party such as a security buffer device. The query can include a search parameter that can include network identification information. For example, the security buffer device can request a list of all networks that have had a previous security breach. The information can be accessed by any device that can access either an online search means, such as a weblink, a widget, a web page, or the like, or an offline search means, such as a QR or other barcode, other shortlink means, or the like. The security management platform server 400 can also include a search component 404 that can search a data store component 406 for a plurality or a subset of secure or unsecure networks. The filter component 408 can filter the results from the search component 404 according to a criterion. The criterion can be preset criterion, like proximity of location, or set by the user, like a preference-based priority of networks. The results isolated by the filer component 408 can be displayed by a display component 410 on a screen associated with the device making the query, whereby the device can be the end-user device or the security buffer device. The security management platform server 400 can also include a verification component 412 that can contact the network if the security policy requires verification.

Figure 5:
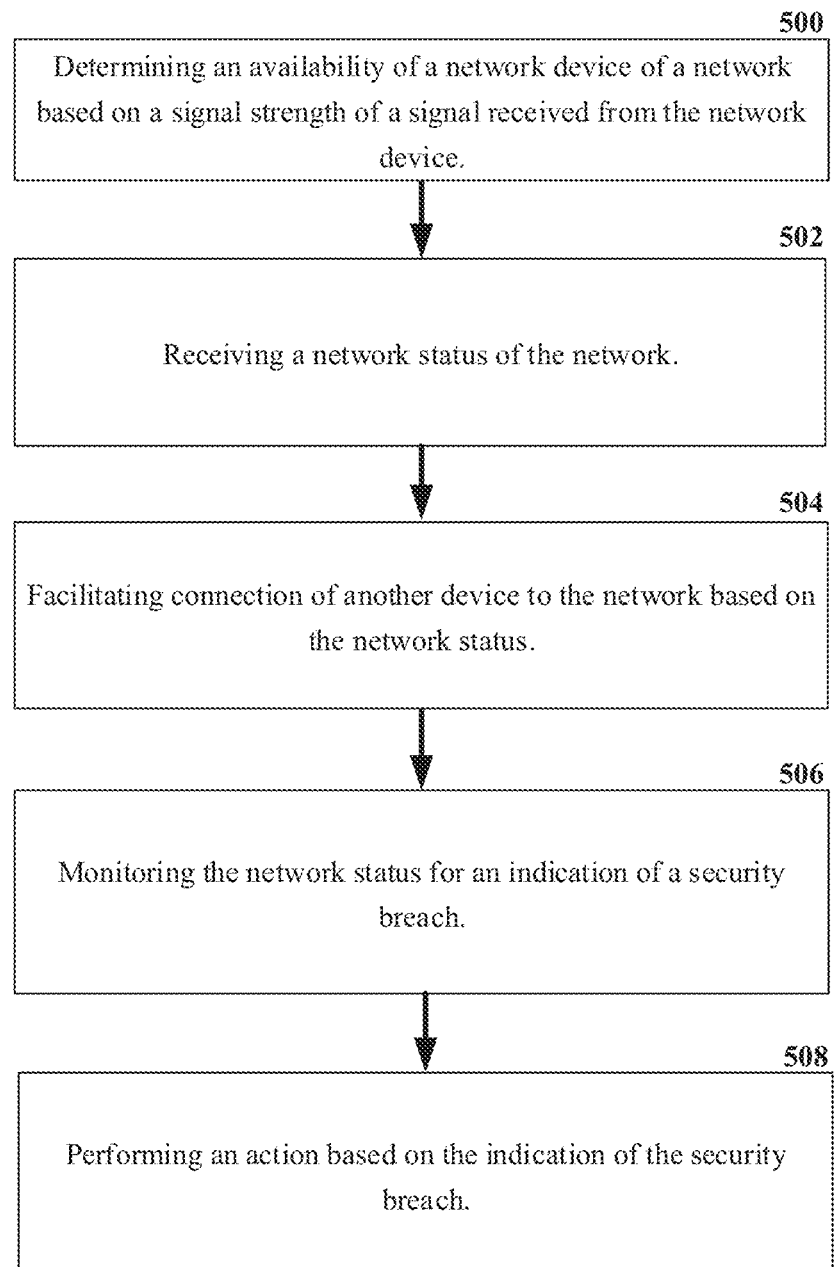
FIG. 5 illustrates a schematic process flow diagram of a method for securely connecting to a wireless network.

Referring now to FIG. 5, illustrated is a schematic process flow diagram of a method for securely connecting to a network. Element 500 can use transceivers to determine the availability of a network device of a network based on the signal strength received from the network device. Network availability can depend on the network being determined to not have a security breach and/or the security buffer devices location proximate to the network device. Thus, a weak network signal may indicate that the security buffer device is not within range to connect to a specific network. Element 502 can receive a network status from a network. The status of a network can include, but is not limited to available, unavailable, online, offline, etc. An unavailable network can indicate that the network is prone to security breaches. At element 504 the security buffer device can facilitate connection of an end-user device to the network based on the network status. A network status of available can indicate a high probability that an end-user device can be connected to that network via the security buffer device.

Once there is an established connection between the end-user device, the security buffer device, and an available network, element 506 can monitor the network status for an indication of a security breach. A security breach can comprise but is not limited to a virus, malicious software/data, and/or an attempt at unauthorized access to the end-user device. If there is an indication of a security breach at element 506, the security buffer device can perform an action based on the indication of the security breach. Said action can include, but is not limited to: 1) preventing multiple end-user devices connected to the security buffer device from communicating with each other; 2) blocking communication between the network and the network security buffer device during a lockdown; 3) only allowing HTTP traffic to the security buffer device; 4) closing wired or wireless security buffer device ports if there is a security breach; 5) causing the security buffer device to disengage any connected end-user devices; 6) causing the security buffer device to select another available network; 7) causing the security buffer device to display an indication that a security breach has occurred; and/or 8) sending a notification that a lockdown has occurred.

Figure 6:
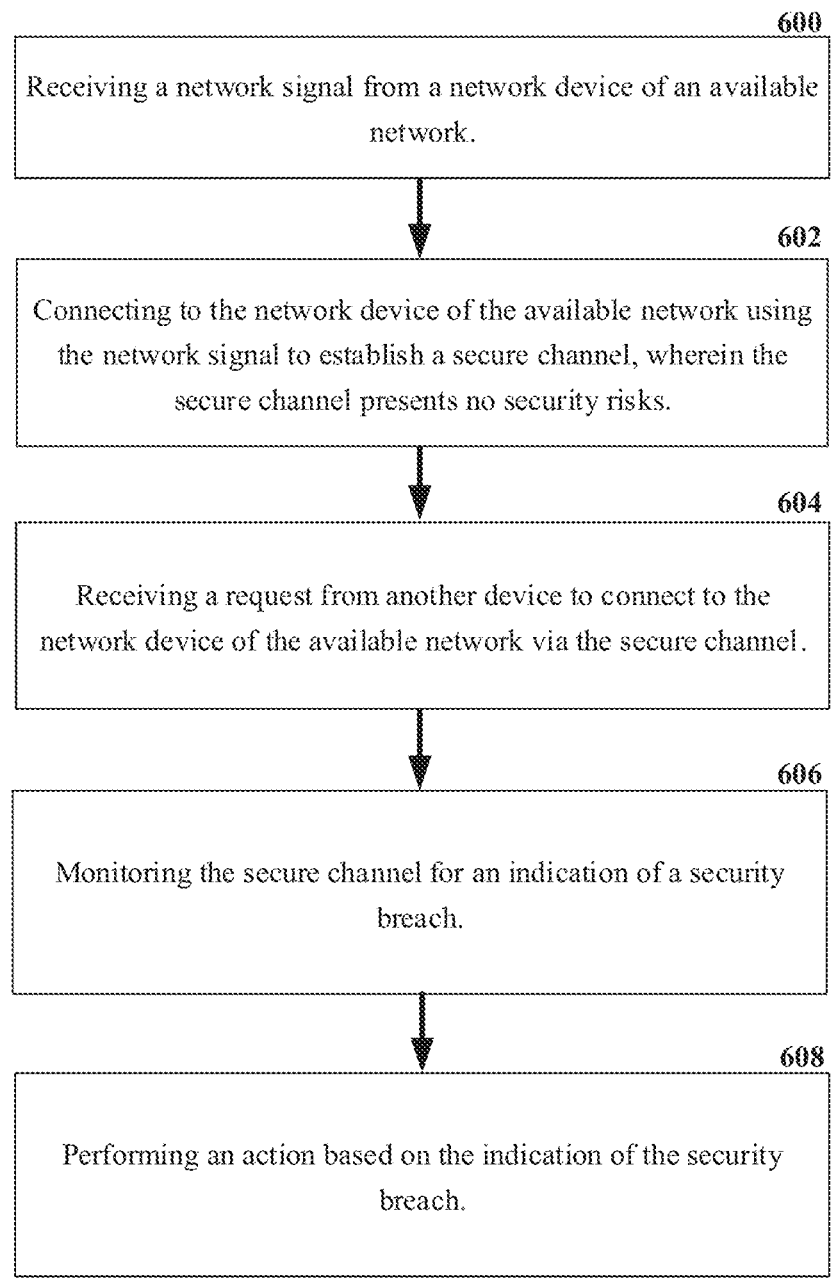
FIG. 6 illustrates a schematic process flow diagram for receiving a signal from an available network and connecting a device to the network.

Referring now to FIG. 6, illustrated is a schematic process flow diagram for receiving a signal from an available network and connecting an end-user device to the network. Element 600 can use transceivers to receive network signals from a network device of an available network. The network signal can comprise a network status from a network. The status of a network can include, but is not limited to available, unavailable, online, offline, etc. Network availability can depend on the network being determined to not have a security breach and/or the security buffer devices location proximate to a network device. An unavailable network can indicate that the network is prone to security breaches. Thus, a weak network signal may indicate that the security buffer device is not within range to connect to a specific network. An unavailable network can indicate that the network is prone to security breaches. Element 602 connects to the available network, via the network signal, to establish a secure channel. A channel can be secure if it presents no or limited security risks. Once the security buffer device has connected to an available network, the security buffer device can receive a request from an end-user device to connect to the available network via the secure channel at element 604.

At element 606 the security buffer device can monitor the secure channel for an indication of a security breach. A security breach can comprise but is not limited to a virus, malicious software/data, and/or an attempt at unauthorized access to the end-user device. If there is an indication of a security breach at element 606, the security buffer device can perform an action based on the indication of the security breach. Said action can include, but is not limited to: 1) preventing multiple end-user devices connected to the security buffer device from communicating with each other; 2) blocking communication between the network and the network security buffer device during a lockdown; 3) only allowing HTTP traffic to the security buffer device; 4) closing wired or wireless security buffer device ports if there is a security breach; 5) causing the security buffer device to disengage any connected end-user devices; 6) causing the security buffer device to select another available network; 7) causing the security buffer device to display an indication that a security breach has occurred; and/or 8) sending a notification that a lockdown has occurred.

Figure 7:
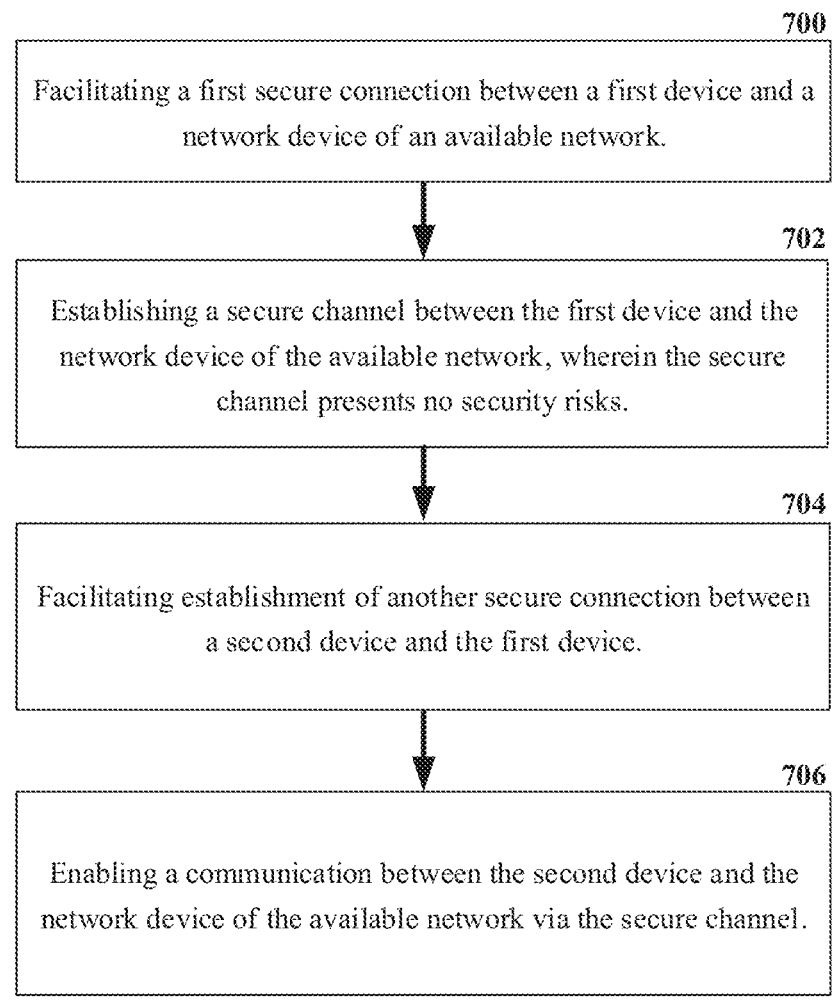
FIG. 7 illustrates a schematic process flow diagram of a connection between a first device and a network device to facilitate a secure connection between a second device and the network device.

Referring now to FIG. 7, illustrated is a schematic process flow diagram of a connection between a first device and a network device to facilitate a secure connection between a second device and a first device. Element 700 can facilitate a first secure connection between a security buffer device and a network device of an available network. The status of a network can include, but is not limited to available, unavailable, online, offline, etc. Network availability can depend on the network being determined to not have a security breach and/or the security buffer devices location proximate to a network device. An unavailable network can indicate that the network is prone to security breaches. Thus, a weak network signal may indicate that the security buffer device is not within range to connect to a specific network. An unavailable network can indicate that the network is prone to security breaches. Element 702 establishes a secure channel between the security buffer device and the network device of an available network. A channel can be secure if it presents no or limited security risks. Once the security buffer device has connected to an available network, the security buffer device can facilitate a second secure connection between an end-user device and the security buffer device at element 704. At element 706 communication is enabled between the end-user device and the network device of an available network via the secure channel.

A security breach can comprise but is not limited to a virus, malicious software/data, and/or an attempt at unauthorized access to the end-user device. If there is an indication of a security breach, the security buffer device can perform an action based on the indication of the security breach. Said action can include, but is not limited to: 1) preventing multiple end-user devices connected to the security buffer device from communicating with each other; 2) blocking communication between the network and the network security buffer device during a lockdown; 3) only allowing HTTP traffic to the security buffer device; 4) closing wired or wireless security buffer device ports if there is a security breach; 5) causing the security buffer device to disengage any connected end-user devices; 6) causing the security buffer device to select another available network; 7) causing the security buffer device to display an indication that a security breach has occurred; and/or 8) sending a notification that lockdown has occurred.

Figure 8:
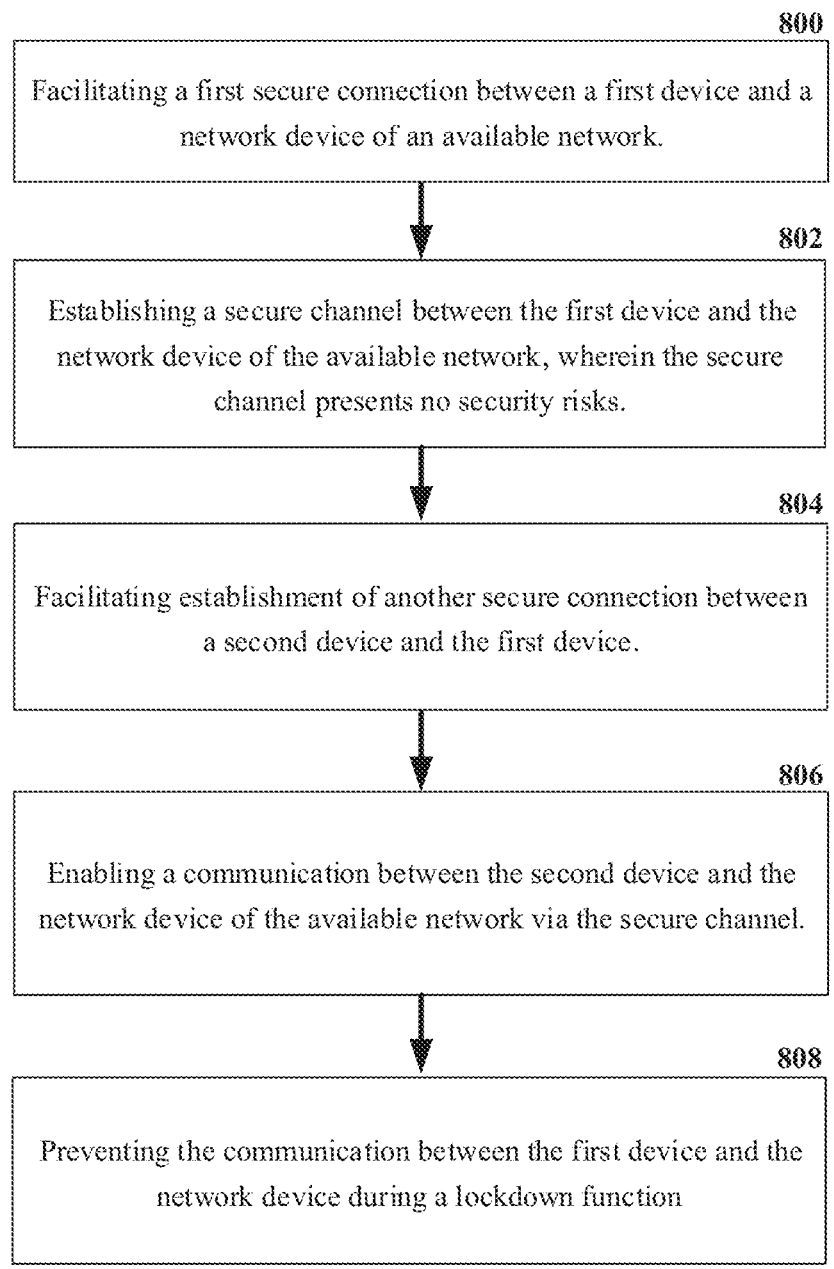
FIG. 8 illustrates a schematic process flow diagram of a connection between a second device and a network device, where a first device disconnects the connection between the second device and the network device during a lockdown function.

Referring now to FIG. 8, illustrated is a schematic process flow diagram of a connection between a second device and a network device, where a first device disconnects the connection between the second device and the network device during a lockdown function. Element 800 can facilitate a first secure connection between a security buffer device and a network device of an available network. The status of a network can include, but is not limited to available, unavailable, online, offline, etc. Network availability can depend on the network being determined to not have a security breach and/or the security buffer devices location proximate to a network device. An unavailable network can indicate that the network is prone to security breaches. Thus, a weak network signal may indicate that the security buffer device is not within range to connect to a specific network. An unavailable network can indicate that the network is prone to security breaches. Element 802 establishes a secure channel between the security buffer device and the network device of an available network. A channel can be secure if it presents no or limited security risks. Once the security buffer device has connected to an available network, the security buffer device can facilitate a second secure connection between an end-user device and the security buffer device at element 804. At element 806 communication is enabled between the end-user device and the network device of an available network via the secure channel.

A security breach can comprise but is not limited to a virus, malicious software/data, and/or an attempt at unauthorized access to the end-user device. If there is an indication of a security breach, the security buffer device can perform an action based on the indication of the security breach. Said action can include, but is not limited to: 1) preventing multiple end-user devices connected to the security buffer device from communicating with each other; 2) blocking communication between the network and the network security buffer device during a lockdown; 3) only allowing HTTP traffic to the security buffer device; 4) closing wired or wireless security buffer device ports if there is a security breach; 5) causing the security buffer device to disengage any connected end-user devices; 6) causing the security buffer device to select another available network; 7) causing the security buffer device to display an indication that a security breach has occurred; and/or 8) sending a notification that lockdown has occurred. Therefore, if a security breach is determined at element 808, the security buffer device can prevent communication between the end-user device and the network device during a lockdown function.

Figure 9:
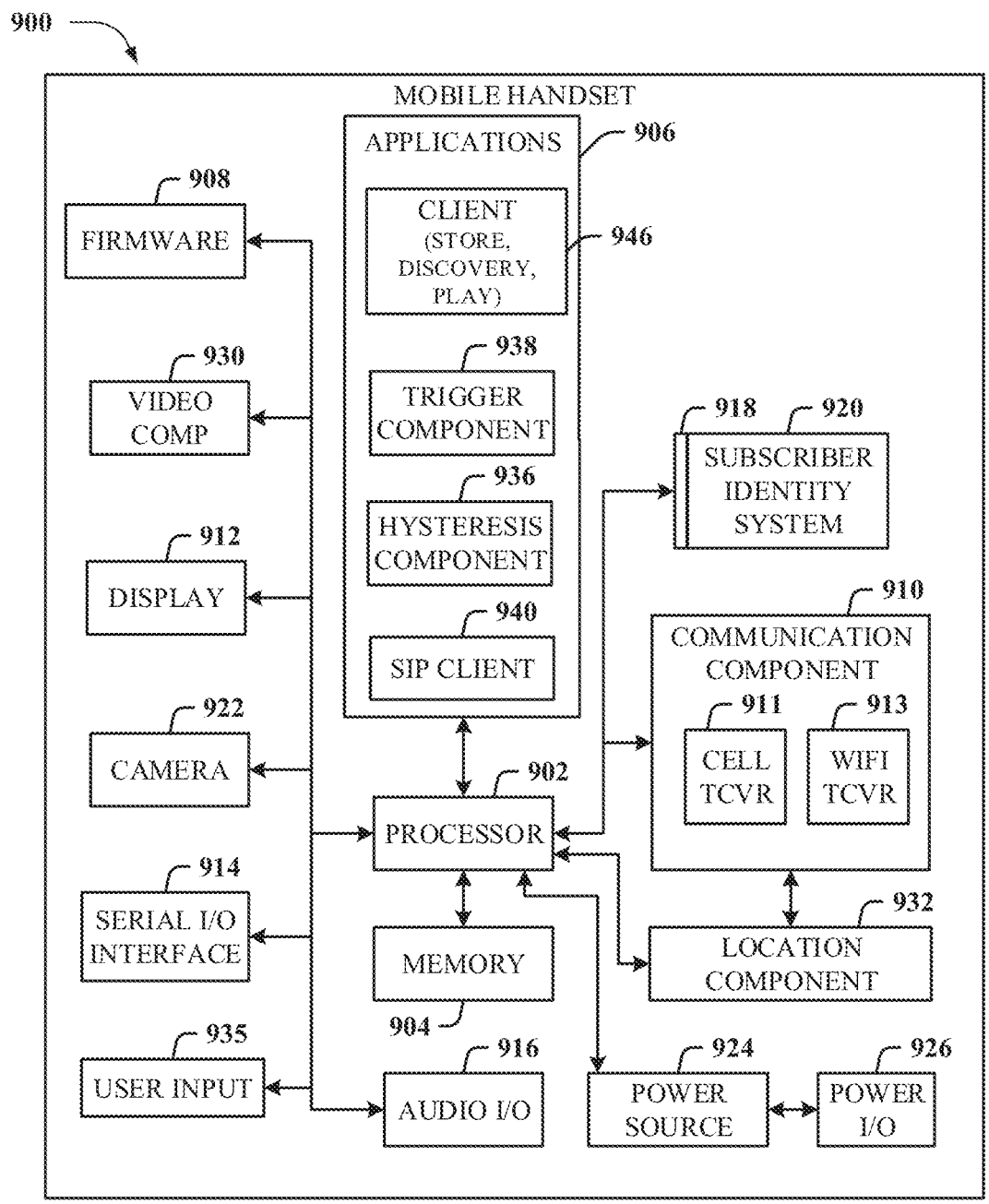
FIG. 9 illustrates a block diagram of an example mobile handset operable to engage in a system architecture that facilitates secure wireless communication according to the embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the disclosure herein. The following discussion is intended to provide a brief, general description of an example of a suitable environment 900 in which the various embodiments can be implemented. While the description includes a general context of computer-executable instructions embodied on a computer readable storage medium, those skilled in the art will recognize that the disclosure also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., WiFi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the WiFi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., WiFi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
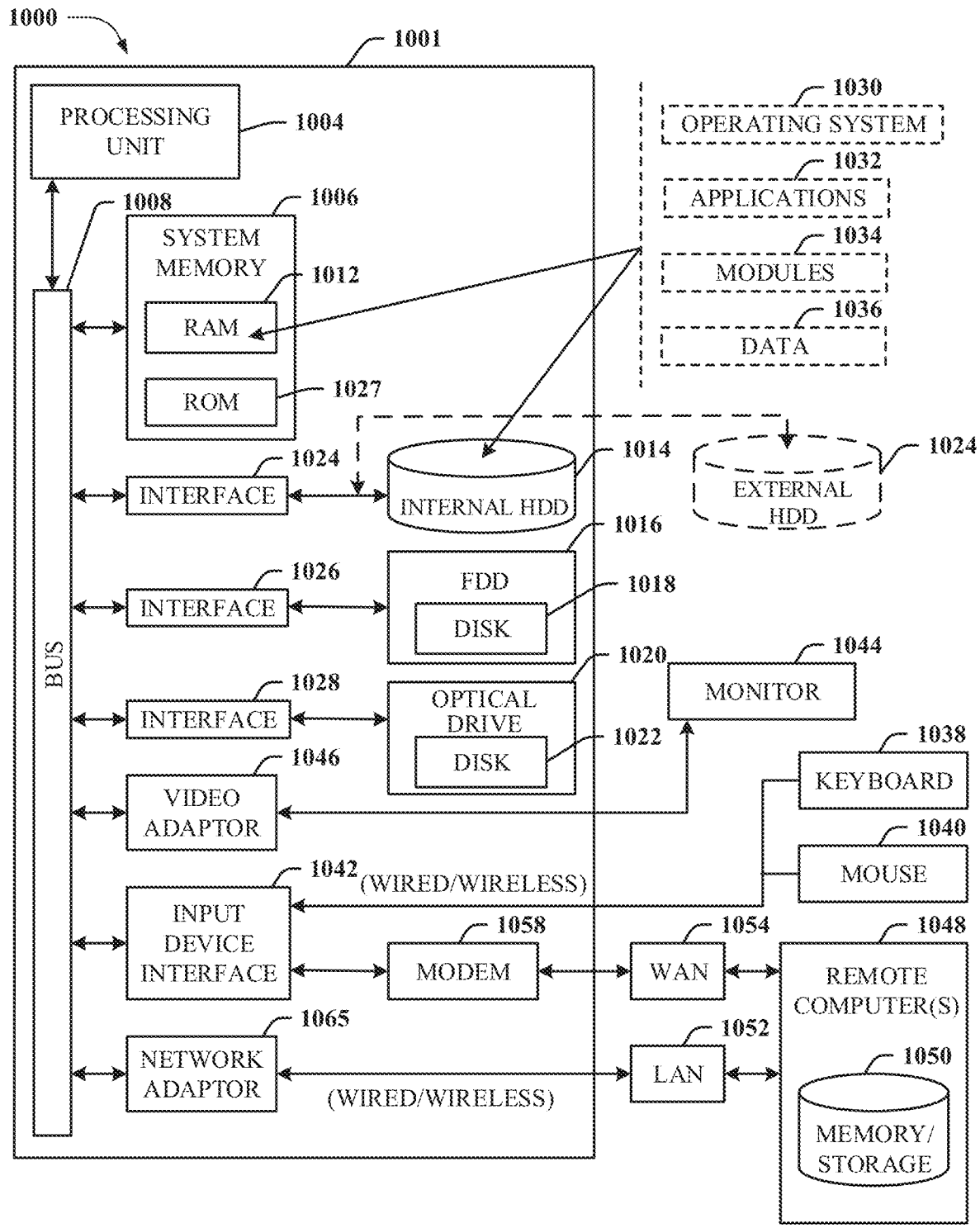
FIG. 10 illustrates a block diagram of an example computer operable to engage in a system architecture that facilitates secure wireless communication according to the embodiments described herein.

Referring now to FIG. 10, there is illustrated a block diagram of a computer 1000 operable to execute a system architecture that facilitates establishing a transaction between an entity and a third party. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the disclosure can be implemented to facilitate the establishment of a transaction between an entity and a third party. While the description above is in the general context of computer-executable instructions that can run on one or more computers, those skilled in the art will recognize that the disclosure also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosure can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1011 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the subject disclosure.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 908 through the serial port interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
 based on global positioning system data associated with a network device of a network, connecting, by a first device comprising a processor, to the network device of the network to establish a secure channel, wherein the secure channel eliminates a security risk that a non-secure channel does not eliminate;
 based on the global positioning system data associated with the network device, determining, by the first device, that the first device is in a previous location associated with a first security breach relating to the network device at a prior time to a current time;
 in response to the determining, displaying, by the first device, warning data associated with the security risk and indicative of a warning that there has been a change of status of the second device based on the security risk, via a display screen of the first device;
 in response to the determining, modifying, by the first device, a channel status, associated with the non-secure channel, to indicate that the non-secure channel is associated with the first security breach;
 receiving, by the first device, a request from a second device to connect to the network device of the network using the secure channel;
 in response to the request, enabling, by the first device, a communication between the second device and the network device of the network via the secure channel;
 sending, by the first device, message data related to the first security breach to the second device via the secure channel;
 monitoring, by the first device, the secure channel for an indication of a second security breach associated with the previous location; and
 performing, by the first device, an action based on the indication of the second security breach.

2. The method of claim 1, further comprising:
 receiving, by the first device, a network policy, via a security management platform of the first device, to apply to the secure channel.

3. The method of claim 2, further comprising:
 based on the network policy, preventing, by the first device, third devices from communicating with each other via the secure channel, wherein the first device is a buffer device.

4. The method of claim 1, wherein the action comprises buffering a communication by blocking a third device from communicating with the second device in response to the indication of the second security breach.

5. The method of claim 1, wherein the action comprises a lockdown function that disconnects the second device from the network device of the network.

6. The method of claim 5, wherein the action further comprises sending notification data related to a notification that the lockdown function has disconnected the second device.

7. The method of claim 5, wherein the network device is a first network device, and wherein the lockdown function comprises disengaging from the first network device of the network and connecting to a second network device of a next available network other than the network.

8. The method of claim 1, further comprising:
sending, by the first device, credentials of the network device of the network that has experienced the first security breach.

9. The method of claim 1, further comprising:
in response to the network device of the network experiencing the first security breach, reducing, by the first device, a priority rating associated with the network device from a first priority rating to a second priority rating.

10. A non-transitory machine-readable storage medium, comprising executable instructions that, when executed by a processor, facilitate performance of operations, comprising:
based on location data of a first device, facilitating establishing a secure channel between the first device and a network device of an available network, wherein the secure channel mitigates a security risk relative to an unsecure channel that does not mitigate the security risk;
based on the location data, determining that the first device is in a previous location associated with a first security breach;
in response to the determining, modifying a channel status, associated with the unsecure channel, to indicate that the unsecure channel is associated with the first security breach;
based on a request from a second device, facilitating establishment of a second secure connection between the second device and the first device;
sending message data related to the first security breach to the second device via the second secure connection;
monitoring the secure channel for a first indication of a second security breach associated with the location data; and
based on the first indication of the second security breach, enabling a communication between the second device and the network device of the available network via the secure channel and facilitating displaying, via the first device, warning data associated with the security risk and a second indication that there has been a change of a status of the second device based on the security risk.

11. The non-transitory machine-readable storage medium of claim 10, wherein the operations further comprise prioritizing a selection of the network device of the available network based on a preference.

12. The non-transitory machine-readable storage medium of claim 10, wherein the second secure connection is a wireless connection.

13. The non-transitory machine-readable storage medium of claim 10, wherein the operations further comprise blocking a communication between the first device and the network device during a lockdown function.

14. The non-transitory machine-readable storage medium of claim 10, wherein the operations further comprise:
in response to the first security breach, sending visual alert data associated with a visual alert indicative of the first security breach.

15. A system, comprising:
a processor; and
a memory that stores executable instructions that, when executed by the processor, facilitate performance of operations, comprising:
based on global positioning system data related to a global positioning system location of a first network device of an available network, connecting to the first network device to establish a secure channel, wherein the secure channel eliminates a security risk that a non-secure channel does not eliminate;
based on the global positioning system data, determining, that the first network device is in a previous location associated with a first security breach;
in response to the determining, modifying a channel status, associated with the non-secure channel, to indicate that the non-secure channel is associated with the first security breach;
receiving a request from a second network device to connect to the first network device of the available network using the secure channel;
in response to the request, enabling a communication between the second network device and the first network device of the available network via the secure channel;
sending message data related to the first security breach to the second network device via the secure channel;
monitoring the secure channel for an indication of a second security breach associated with the previous location; and
performing an action based on the indication of the second security breach, wherein the performing the action comprises facilitating displaying warning data indicative that there has been a change of a status of the second network device based on the security risk.

16. The system of claim 15, wherein the sending the message data is first sending of first message data, and wherein the operations further comprise:
initiating a second sending of second message data associated with a second message, comprising an updated network status, to the second network device.

17. The system of claim 15, wherein the operations further comprise:
in response to the first security breach, sending audio alert data associated with an audio alert indicative of the first security breach.

18. The system of claim 15, wherein the operations further comprise:
in response to receiving agreement data related to a service provider agreement, facilitating a selection of network devices other than the first network device and the second network device.

19. The system of claim 18, wherein the operations further comprise:
determining predefined networks comprising determining a network selection based on the agreement data related to the service provider agreement.

20. The system of claim 15, wherein the operations further comprise:
confirming that a Wi-Fi connection of the first network device has access to a publicly available wide area network.

* * * * *